United States Patent
Lourenco et al.

(10) Patent No.: US 11,173,445 B2
(45) Date of Patent: Nov. 16, 2021

(54) METHOD OF PREPARING NATURAL GAS AT A GAS PRESSURE REDUCTION STATIONS TO PRODUCE LIQUID NATURAL GAS (LNG)

(71) Applicants: 1304338 Alberta Ltd., Edmonton (CA); 1304342 Alberta Ltd., Edmonton (CA)

(72) Inventors: Jose Lourenco, Edmonton (CA); MacKenzie Millar, Edmonton (CA)

(73) Assignees: 1304338 Alberta Ltd., Edmonton (CA); 1304342 Alberta Ltd., Edmonton (CA)

( * ) Notice: Subject to any disclaimer, the term of this patent is extended or adjusted under 35 U.S.C. 154(b) by 570 days.

(21) Appl. No.: 15/759,700

(22) PCT Filed: Sep. 16, 2015

(86) PCT No.: PCT/CA2015/050896
§ 371 (c)(1),
(2) Date: Mar. 13, 2018

(87) PCT Pub. No.: WO2017/045055
PCT Pub. Date: Mar. 23, 2017

(65) Prior Publication Data
US 2019/0046921 A1 Feb. 14, 2019

(51) Int. Cl.
*B01D 53/14* (2006.01)
*C10L 3/10* (2006.01)
*F25J 3/02* (2006.01)

(52) U.S. Cl.
CPC ..... *B01D 53/1425* (2013.01); *B01D 53/1475* (2013.01); *C10L 3/10* (2013.01);
(Continued)

(58) Field of Classification Search
None
See application file for complete search history.

(56) References Cited

U.S. PATENT DOCUMENTS

| 2,168,438 A | 8/1939 | Carrier |
| 3,002,362 A | 10/1961 | Morrison |

(Continued)

FOREIGN PATENT DOCUMENTS

| CA | 1048876 A | 2/1979 |
| CA | 2 422 893 A1 | 2/2002 |

(Continued)

OTHER PUBLICATIONS

Hudson, H.M., et al., "Reducing Treating Requirements for Cryogenic NGL Recovery Plants," Proceedings of the 80th Annual Convention of the Gas Processors Association, Mar. 12, 2001, San Antonio, Texas, 15 pages.
(Continued)

*Primary Examiner* — Christopher P Jones
*Assistant Examiner* — Phillip Y Shao
(74) *Attorney, Agent, or Firm* — Christensen O'Connor Johnson Kindness PLLC

(57) ABSTRACT

A method to pre-treat an inlet natural gas stream at gas pressure reduction stations to produce LNG removes water and carbon dioxide from a natural gas stream. The energy required for the process is provided by recovering pressure energy in the inlet gas stream. The process eliminates the conventional gas pre-heating process at pressure reductions stations employing gas combustion heaters. The process provides a method to produce LNG at natural gas pressure reduction that meets product specifications.

7 Claims, 3 Drawing Sheets

(52) U.S. Cl.
CPC .............. *C10L 3/104* (2013.01); *F25J 3/0209* (2013.01); *F25J 3/0233* (2013.01); *F25J 3/0238* (2013.01); *B01D 2252/2021* (2013.01); *B01D 2257/502* (2013.01); *B01D 2257/80* (2013.01); *C10L 2290/545* (2013.01); *F25J 2200/02* (2013.01); *F25J 2200/78* (2013.01); *F25J 2205/04* (2013.01); *F25J 2205/40* (2013.01); *F25J 2205/50* (2013.01); *F25J 2210/06* (2013.01); *F25J 2215/04* (2013.01); *F25J 2220/66* (2013.01); *F25J 2220/68* (2013.01); *F25J 2230/30* (2013.01); *F25J 2240/02* (2013.01); *F25J 2240/30* (2013.01); *F25J 2270/04* (2013.01); *F25J 2270/08* (2013.01); *F25J 2270/88* (2013.01); *F25J 2290/60* (2013.01); *Y02C 20/40* (2020.08)

(56) References Cited

U.S. PATENT DOCUMENTS

| | | | |
|---|---|---|---|
| 3,152,194 | A | 10/1964 | Pohl et al. |
| 3,184,926 | A | 5/1965 | Blake |
| 3,241,933 | A | 3/1966 | Ploum et al. |
| 3,280,575 | A | 10/1966 | Drake |
| 3,315,475 | A | 4/1967 | Harmens |
| 3,367,122 | A | 2/1968 | Tutton |
| 3,653,220 | A | 4/1972 | Foster et al. |
| 3,735,600 | A | 5/1973 | Dowdell et al. |
| 3,747,359 | A | 7/1973 | Streich |
| 3,754,405 | A | 8/1973 | Rosen |
| 3,792,590 | A | 2/1974 | Lofredo et al. |
| 3,846,993 | A | 11/1974 | Bates |
| 3,859,811 | A | 1/1975 | Duncan |
| 3,892,103 | A | 7/1975 | Antonelli |
| 3,919,853 | A | 11/1975 | Rojey |
| 3,962,881 | A | 6/1976 | Muska |
| 4,033,735 | A | 7/1977 | Swenson |
| 4,041,724 | A | 8/1977 | Gustafsson |
| 4,170,115 | A | 10/1979 | Ooka et al. |
| 4,279,130 | A | 7/1981 | Finch et al. |
| 4,418,530 | A | 12/1983 | Bodrov et al. |
| 4,424,680 | A | 1/1984 | Rothchild |
| 4,430,103 | A | 2/1984 | Gray et al. |
| 4,444,577 | A | 4/1984 | Perez |
| 4,617,039 | A | 10/1986 | Buck |
| 4,681,612 | A | 7/1987 | O'Brien et al. |
| 4,710,214 | A | 12/1987 | Sharma et al. |
| 4,751,151 | A | 6/1988 | Healy et al. |
| 4,869,740 | A | 9/1989 | Campbell et al. |
| 4,907,405 | A | 3/1990 | Polizzotto |
| 4,936,888 | A | 6/1990 | DeLong |
| 5,026,952 | A | 6/1991 | Bauer |
| 5,062,270 | A | 11/1991 | Haut et al. |
| 5,137,558 | A | 8/1992 | Agrawal |
| 5,295,350 | A | 3/1994 | Child et al. |
| 5,329,774 | A | 7/1994 | Tanguay et al. |
| 5,425,230 | A | 6/1995 | Shpak |
| 5,440,894 | A | 8/1995 | Schaeffer et al. |
| 5,560,212 | A | 10/1996 | Hansen |
| 5,678,411 | A | 10/1997 | Matsumura et al. |
| 5,685,170 | A | 11/1997 | Sorensen |
| 5,743,110 | A | 4/1998 | Laude-Bousquet |
| 5,782,958 | A | 7/1998 | Rojey et al. |
| 5,799,505 | A | 9/1998 | Bonaquist et al. |
| 5,953,935 | A | 9/1999 | Sorensen |
| 5,956,971 | A | 9/1999 | Cole et al. |
| 5,983,663 | A | 11/1999 | Sterner |
| 6,089,022 | A | 7/2000 | Zednik et al. |
| 6,089,028 | A | 7/2000 | Bowen et al. |
| 6,131,407 | A | 10/2000 | Wissolik |
| 6,138,473 | A | 10/2000 | Boyer-Vidal |
| 6,182,469 | B1 | 2/2001 | Campbell et al. |
| 6,266,968 | B1 | 7/2001 | Redlich |
| 6,286,315 | B1 | 9/2001 | Staehle |
| 6,378,330 | B1 | 4/2002 | Minta et al. |
| 6,401,486 | B1 | 6/2002 | Lee et al. |
| 6,432,565 | B1 | 8/2002 | Haines |
| 6,517,286 | B1 | 2/2003 | Latchem |
| 6,526,777 | B1 | 3/2003 | Campbell et al. |
| 6,581,409 | B2 | 6/2003 | Wilding et al. |
| 6,606,860 | B2 | 8/2003 | McFarland |
| 6,640,555 | B2 | 11/2003 | Cashin |
| 6,662,589 | B1 | 12/2003 | Roberts et al. |
| 6,694,774 | B1 | 2/2004 | Rashad et al. |
| 6,739,140 | B2 | 5/2004 | Bishop et al. |
| 6,751,985 | B2 | 6/2004 | Kimble et al. |
| 6,889,523 | B2 | 5/2005 | Wilkinson et al. |
| 6,932,121 | B1 | 8/2005 | Shivers, III |
| 6,945,049 | B2 | 9/2005 | Madsen |
| 7,051,553 | B2 | 5/2006 | Mak et al. |
| 7,107,788 | B2 | 9/2006 | Patel et al. |
| 7,155,917 | B2 | 1/2007 | Baudat |
| 7,219,502 | B2 | 5/2007 | Nierenberg |
| 7,257,966 | B2 | 8/2007 | Lee et al. |
| 7,377,127 | B2 | 5/2008 | Mak |
| 8,429,932 | B2 | 4/2013 | Lourenco et al. |
| 8,640,494 | B2 | 2/2014 | Lourenco et al. |
| 8,850,849 | B2 | 10/2014 | Martinez et al. |
| 8,887,513 | B2 | 11/2014 | Kotzot et al. |
| 2002/0170297 | A1 | 11/2002 | Quine et al. |
| 2003/0008605 | A1 | 1/2003 | Hartford, Jr. et al. |
| 2003/0019219 | A1 | 1/2003 | Viegas et al. |
| 2003/0051875 | A1 | 3/2003 | Wilson |
| 2003/0182947 | A1 | 10/2003 | Kimble et al. |
| 2003/0196452 | A1 | 10/2003 | Wilding et al. |
| 2004/0065085 | A1 | 4/2004 | Madsen |
| 2005/0086974 | A1 | 4/2005 | Steinbach et al. |
| 2005/0244277 | A1 | 11/2005 | Hurst, Jr. et al. |
| 2006/0213222 | A1 | 9/2006 | Whitesell |
| 2006/0213223 | A1 | 9/2006 | Wilding et al. |
| 2006/0242970 | A1 | 11/2006 | Yang et al. |
| 2006/0260355 | A1 | 11/2006 | Roberts et al. |
| 2007/0062216 | A1 | 3/2007 | Mak et al. |
| 2007/0107465 | A1 | 5/2007 | Turner et al. |
| 2008/0016910 | A1 | 1/2008 | Brostow et al. |
| 2009/0084132 | A1 | 4/2009 | Dragomir et al. |
| 2009/0113928 | A1 | 5/2009 | Vandor et al. |
| 2009/0194460 | A1 | 8/2009 | Klein Nagul Voort et al. |
| 2009/0194461 | A1 | 9/2009 | Bras et al. |
| 2009/0249829 | A1 | 10/2009 | Lourenco et al. |
| 2009/0282863 | A1 | 11/2009 | Lourenco et al. |
| 2009/0282865 | A1 | 11/2009 | Martinez et al. |
| 2010/0000234 | A1 | 1/2010 | Bras et al. |
| 2010/0242499 | A1 | 9/2010 | Lourenco et al. |
| 2010/0287985 | A1 | 11/2010 | Martinez et al. |
| 2011/0036122 | A1 | 2/2011 | Betting et al. |
| 2011/0067441 | A1 | 3/2011 | Martinez et al. |
| 2011/0094263 | A1 | 4/2011 | Wilding et al. |
| 2011/0174017 | A1 | 7/2011 | Victory et al. |
| 2012/0036888 | A1 | 2/2012 | Vandor |
| 2012/0060554 | A1 | 3/2012 | Schmidt |
| 2012/0096896 | A1 | 4/2012 | Patel |
| 2012/0169049 | A1 | 7/2012 | Oxner et al. |
| 2012/0255325 | A1 | 10/2012 | Prim |
| 2013/0333416 | A1 | 12/2013 | Lourenco et al. |
| 2015/0016952 | A1 | 1/2015 | Oxner |
| 2015/0143842 | A1 | 5/2015 | Lourenco et al. |

FOREIGN PATENT DOCUMENTS

| | | |
|---|---|---|
| CA | 2 467 338 A1 | 7/2003 |
| CA | 2 516 785 A1 | 9/2004 |
| CA | 2 552 366 A1 | 7/2005 |
| CA | 2 299 695 A1 | 7/2007 |
| CA | 2 536 075 C | 7/2007 |
| CA | 2 318 802 A1 | 2/2008 |
| CA | 2 777 760 A1 | 5/2011 |
| CA | 2 728 716 A1 | 7/2012 |
| CA | 2 515 999 A1 | 12/2012 |
| CA | 2 763 081 A1 | 6/2013 |
| CN | 1615415 A | 5/2005 |
| CN | 101948706 A | 1/2011 |
| DE | 44 16 359 A1 | 11/1995 |

(56) References Cited

FOREIGN PATENT DOCUMENTS

| | | |
|---|---|---|
| EP | D 482 222 A1 | 4/1992 |
| EP | D 566 285 A1 | 10/1993 |
| EP | D 635 673 A1 | 1/1995 |
| EP | D 780 649 A1 | 6/1997 |
| FR | 2 420 081 A1 | 10/1979 |
| GB | 1011453 | 12/1965 |
| GB | 2 103 354 A | 2/1983 |
| JP | 3-236589 A | 10/1991 |
| JP | 5-263998 A | 10/1993 |
| JP | 2002-295799 A | 10/2002 |
| JP | 2003-165707 A | 6/2003 |
| RU | 2 180 420 C2 | 3/2002 |
| RU | 2 232 342 C1 | 7/2004 |
| WO | 94/11626 A1 | 5/1994 |
| WO | 97/01069 A1 | 1/1997 |
| WO | 98/59205 A2 | 12/1998 |
| WO | 99/31447 A3 | 6/1999 |
| WO | 00/52403 A1 | 9/2000 |
| WO | 03/081038 A1 | 10/2003 |
| WO | 03/095913 A1 | 11/2003 |
| WO | 03/095914 A1 | 11/2003 |
| WO | 2004/010480 A1 | 1/2004 |
| WO | 2004/052511 A1 | 6/2004 |
| WO | 2004/109180 A1 | 12/2004 |
| WO | 2004/109206 A1 | 12/2004 |
| WO | 2005/045337 A1 | 5/2005 |
| WO | 2006/004723 A1 | 1/2006 |
| WO | 2006/019900 A1 | 2/2006 |
| WO | 2006/036441 A1 | 4/2006 |
| WO | 2008/006221 A1 | 1/2008 |
| WO | 2009/061777 A1 | 5/2009 |
| WO | 2012/015554 A1 | 2/2012 |
| WO | 2014/032179 A1 | 3/2014 |

OTHER PUBLICATIONS

Kidnay, A.J., and W.H. Parrish, "Fundamentals of Natural Gas Processing," Taylor & Francis Group, Abingdon, U.K., © 2006, 440 pages.

International Search Report and Written Opinion dated Jul. 18, 2014, issued in corresponding International Application No. PCT/CA2014/050374, filed Apr. 14, 2014, 9 pages.

International Search Report and Written Opinion dated May 1, 2012, issued in corresponding International Application No. PCT/CA2012/050030, filed Jan. 18, 2012, 9 pages.

International Search Report and Written Opinion dated Oct. 24, 2013, issued in corresponding International Application No. PCT/CA2013/050639, filed Aug. 19, 2013, 7 pages.

International Search Report and Written Opinion dated Aug. 2, 2013, issued in corresponding International Application No. PCT/CA2013/050363, filed May 10, 2013, 9 pages.

International Search Report and Written Opinion dated Jun. 7, 2016, issued in corresponding International Application No. PCT/CA2015/050896, filed Sep. 16, 2015, 6 pages.

International Search Report and Written Opinion dated Aug. 30, 2016, issued in corresponding International Application No. PCT/CA2016/050559, filed May 19, 2016, 7 pages.

METHOD OF PREPARING NATURAL GAS AT A GAS PRESSURE REDUCTION STATIONS TO PRODUCE LIQUID NATURAL GAS (LNG)

FIELD

This relates to a method that prepares natural gas for the production of LNG at a gas pressure reduction station by recovering the reduction in pressure from the transmission pipeline to distribution pipeline. The recovered pressure energy is converted into electrical and refrigeration energy to prepare and produce LNG.

In one example, to prepare the natural gas for the production of LNG, the water and carbon dioxide content in the natural gas stream is reduced to meet LNG product specifications, and a methanol stream is conditioned by the recovered gas pressure energy at pressure reduction stations to remove water and carbon dioxide from the natural gas stream.

BACKGROUND

Pressure reduction stations are located along main transmission high pressure natural gas pipelines for gas distribution to regional pipelines. The purpose of a pressure reduction station is to control flow and pressure of natural gas to regional distribution pipelines. When the gas pressure is reduced, the temperature is also reduced, this is known as the Joules-Thompson effect. The degree of temperature reduction is dependent on the pressure differentials and the equipment used to reduce the pressure. When the equipment employed is a pressure reduction valve the temperature reduction is about 0.5° C. for every 1 atmosphere pressure change. When the equipment employed is a gas expander turbine the temperature reduction is up to 2° C. for every 1 atmosphere pressure change. This reduction in gas temperature can generate hydrates due to water content in the natural gas stream, to prevent the formation of hydrates the gas requires to be conditioned before the pressure is reduced.

The common practice at existing pressure reduction stations is to use pressure reduction valves, because it results in a lower temperature reduction. To condition the gas and prevent the formation of hydrates, before the pressure is reduced the gas is pre-heated to a temperature that ensures the gas is above 0° C. after pressure reduction.

The typical pressure reduction at these stations, can consume up to 1.5% of its gas flow throughput to regional distribution pipelines to pre-heat the gas and prevent the formation of hydrates.

The production of LNG is typically done in large plants located in areas where gas transmission pipelines are not available and or economical. LNG provides gas producers with an alternative to pipeline transport by shipping it as a liquid to a port. The gas processes to prepare and produce LNG at these large plants require a substantial energy input, its main objective is to transport it to a port where it is re-gasified and transported by high pressure transmission pipelines in a gaseous phase to markets. Recently, the gas industry started promoting the use of LNG as an alternative fuel to diesel, mainly to the trucking industry. The main challenge to the industry is the lack of infra-structure to produce, store and distribute LNG to consumers. The present main supply of LNG is typically delivered in very large quantities to ports, these can be far away from markets resulting in high distribution costs.

A major challenge in the economic production of LNG is the removal of carbon dioxide to meet LNG product specifications. In some proprietary processes, methanol is used as a solvent. Other processes may be based on Rectisol, developed by Lurgi and Ifpexol developed by IFP. The Rectisol process is employed primarily in the purification of synthesis to selectively remove hydrogen sulfide, the typical operating temperatures are between −40 and −60° C. The Ifpexol process is used in natural gas treating applications, to remove water and hydrocarbons in stage 1 and acid gases is stage 2, the typical operating temperatures are −20 to −40° C. In both cases the use of these processes in the industry are limited due to its high capital and operating costs to meet methanol refrigeration needs for the process.

The promotion for use of LNG as a replacement to diesel resulted in the development of mini LNG plants that use external sources of refrigeration such as liquid nitrogen or refrigeration compression cycles. The typical gas pre-treatment is done by use of molecular sieves to remove water and carbon dioxide. Molecular sieves are a proven commercial process, but they are expensive in capital and operating costs.

SUMMARY

According to an aspect, there is provided a method to prepare natural gas for production of liquefied natural gas (LNG) at pressure reduction stations. A first step involves pre-treating the stream of natural gas with methanol to absorb the water fraction, followed by pre-cooling in counter current heat exchangers to condense and recover the methanol and water. A second step involves, further cooling the natural gas and stripping the carbon dioxide in a column with a counter-current stream of refrigerated methanol. A third step involves, refrigerating a regenerated and circulating methanol stream by counter-current heat exchange before returning to stripping column. A fourth step involves, splitting the pre-cooled and pre-treated natural gas stream into two streams; a natural gas stream to regional distribution pipeline and a natural gas stream to LNG production. A fifth step involves, reducing the high pressure, pre-treated, pre-cooled, natural gas stream to the regional distribution pipeline pressure, through a gas expander generator to produce refrigeration and electrical energy. A sixth step involves, further cooling the pre-treated, pre-cooled, high pressure natural gas stream to LNG production in a counter-current heat exchange to condense and remove heavier hydrocarbon fractions, thus controlling natural gas stream to LNG production hydrocarbon specifications. A seventh step involves, further cooling the natural gas LNG product stream with cryogenic vapours from the LNG separator to increase LNG production yield before expanding it to LNG separator pressure. A eighth step involves, raising the temperature of the natural gas stream to regional distribution pipeline by counter-current heat exchange flow with; LNG production stream, regenerated methanol stream to stripping column and inlet gas stream to pressure reduction station, thus eliminating the need for gas pre-heating by combustion.

An objective of the described method is to produce LNG at pressure reduction stations without using external sources of energy, to recover and use transmission pipeline pressure energy to produce LNG and eliminate the practice of pre-heating gas by combustion. The production of LNG at pressure reduction stations provides for its distribution near points of use.

The disclosed method relates to preparing natural gas at a gas pressure reduction station. In a preferred embodiment, the present process prepares natural gas for the production of LNG and electricity comprising:
  (a) First, injecting methanol through a controlled dosage flow into a continuously flowing high pressure inlet natural gas stream to a gas pressure reduction station.
  (b) Second, pre-cooling the continuously flowing inlet natural gas stream to condense, separate and collect; methanol, water and some hydrocarbon condensates.
  (c) Third, further cooling and pre-treatment of the inlet natural gas stream in a methanol stripping column to remove carbon dioxide and remaining traces of water.
  (d) Fourth, routing the methanol stripper tower bottoms stream mixture of methanol, carbon dioxide and some hydrocarbon condensate to a methanol regeneration column.
  (e) Fifth, separate the pre-treated, pre-cooled, high pressure inlet natural gas stream into two streams; gas to regional distribution pipeline and gas to LNG production.
  (f) Sixth, reduce the high pressure the natural gas stream to regional distribution pipeline pressure through a gas expander/generator to generate refrigeration and electrical energy for the process.
  (g) Seventh, recover the generated refrigeration energy in the gas stream to regional distribution pipeline by heat exchange in a counter-current flow with; gas stream to LNG production, methanol to stripping column and pressure reduction station gas inlet stream.
  (h) Eighth, further cool the LNG production stream in a counter-current heat exchanger by cryogenic vapors from the LNG separator.
  (i) Nineth, reduce the high pressure gas stream LNG product stream through an expander/generator to a LNG separator pressure to produce LNG, a liquid stream and a cryogenic hydrocarbon vapour stream.
  (j) Tenth, route the cryogenic hydrocarbon vapour stream in a counter-current heat exchanger with; LNG production stream and pressure reduction station inlet stream to recover the produced refrigeration before compressing it to the regional gas distribution pipeline pressure.

The presently described process for gas pressure reduction stations recovers and uses the transmission gas pipeline pressure energy to produce LNG and eliminate the industry practice of gas pre-heating by combustion.

A major feature of the process is the use of recovered energy at pressure reduction stations to refrigerate methanol for the efficient removal of carbon dioxide in preparation of a gas stream that meets LNG product quality specifications.

Another feature of the process is the conversion of a pressure reduction station from a cost operation to a revenue operation. This utility infra-structure operation currently pre-heats the inlet gas by combustion at a cost. The process eliminates the practice of gas combustion for pre-heating and its associated emissions, moreover it generates revenue by producing an higher value commodity, LNG.

As will hereinafter be described, the above method can operate at any natural gas pressure reduction station to prepare a pipeline natural gas stream for the production of LNG.

The above described method was developed with a view to prepare and produce LNG at gas pressure reduction stations.

As will hereinafter be further described, there is provided a LNG production process, which includes a high pressure pre-treated, pre-cooled natural gas stream, splitting the this gas stream into; a LNG production stream and a regional distribution pipeline stream. The pre-treated, pre-cooled high pressure gas to regional distribution pipeline stream is depressurized through a gas expander/generator to produce a refrigeration gas stream and electricity. The LNG production stream is further cooled by a counter-current heat exchanger with a portion of the refrigeration gas stream to regional pipeline distribution followed by cryogenic hydrocarbon vapour from the LNG separator. The pre-treated, pre-cooled LNG production stream is then expanded through a second gas expander/generator into a LNG separator. The produced liquid fraction LNG is routed to storage. The cryogenic hydrocarbon vapour fraction stream energy is recovered by routing it in a counter-current heat exchangers before compression to regional gas distribution pipeline.

According to an aspect, there is provided a method of producing liquid natural gas (LNG) at gas pressure reduction stations. The gas pressure reduction station receives a high pressure gas as an input and outputting a low pressure gas at an output pressure and temperature range. The method comprises the steps of:
  producing a hydrate inhibited stream by mixing a hydrate inhibitor with at least a portion of the high pressure gas;
  producing a dehydrated gas stream by:
    cooling the hydrate inhibited stream to produce a liquid phase, at least a portion of which comprises water, and separating the liquid phase from the hydrate inhibited stream; and
  removing carbon dioxide using a carbon dioxide stripping agent;
  condensing the dehydrated gas stream to produce a liquid stream of natural gas and a vapour stream of natural gas; and
  outputting the vapour stream as the low pressure gas.

According to another aspect, at least one of the hydrate inhibitor and the carbon dioxide stripping agent may be methanol.

According to another aspect, the hydrate inhibitor and the carbon dioxide stripping agent may be methanol, the methanol being recovered from the dehydrated gas stream and further comprising the step of recycling the methanol by separating the water and carbon dioxide from the methanol.

According to another aspect, outputting the vapour stream as the low pressure gas may comprise adjusting the temperature and pressure to fall within the output pressure and temperature range.

According to another aspect, the carbon dioxide may be vented to atmosphere or output into the low pressure gas.

According to an aspect, there is provided a method to pre-treat and produce LNG at a gas pressure reduction station, comprising:
  providing a high pressure natural gas stream;
  pre-cooling the high pressure natural gas stream in a heat exchanger;
  injecting methanol into the high pressure natural gas stream and separating condensates from the high pressure natural gas stream to produce a dewatered natural gas stream in a phase separator;
  recovering methanol from the condensates using a solvent membrane;
  passing the dewatered natural gas stream through a carbon dioxide stripping column to remove carbon dioxide from the dewatered natural gas stream to produce a treated natural gas stream;
  splitting the treated natural gas stream into a LNG production stream and a distribution stream;
  reducing the gas pressure of the distribution stream using an expander/generator and recovering condensed hydrocarbon fractions from the distribution stream;

injecting a pre-cooled methanol stream through the carbon dioxide stripping column and removing a rich methanol stream from the carbon dioxide stripping column;

reducing the temperature and pressure of the LNG production stream and recovering a liquid hydrocarbon fraction and a gaseous fraction from the LNG product stream;

compressing and outputting the gaseous fraction of the LNG separator stream as an output of the gas pressure reduction station;

recovering methanol from the rich methanol stream by removing the carbon dioxide from the rich methanol stream; and cooling the recovered methanol and splitting the cooled recovered methanol stream into a first methanol stream to be injected into the high pressure natural gas stream and a second methanol stream to be injected into the carbon dioxide stripping column.

According to another aspect, the high pressure gas stream may be pre-cooled by low temperatures produced downstream of the phase separator.

According to another aspect, heat exchangers may be employed to pre-heat the gaseous fraction of the LNG separator stream prior to being output as the output of the gas pressure reduction station.

According to another aspect, the condensates from the high pressure natural gas stream may comprise water.

According to another aspect, the carbon dioxide stripping column may remove carbon dioxide in a counter-current flow with a refrigerated methanol stream.

According to another aspect, the LNG production stream may be cooled to condense heavier hydrocarbon fractions prior to being condensed as LNG.

According to another aspect, the recovered methanol may be cooled using recovered pressure energy at the gas pressure reduction station.

Other objects and aspects will be apparent from the description below and drawings. It will be understood that different examples beyond those described herein may be arrived at by combining the variously described elements in any reasonable manner.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
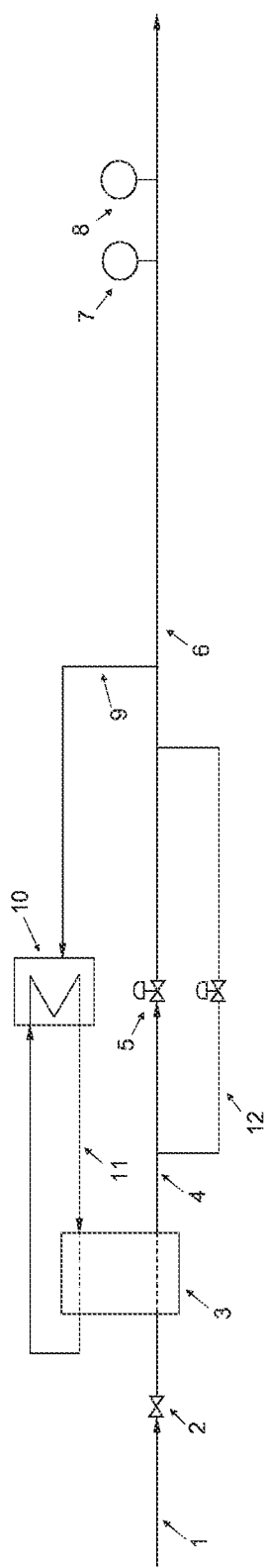
FIG. 1 is a schematic diagram of a typical pressure reduction station equipped with JT valves for controlled pressure reduction to a regional distribution pipeline, a glycol/water heater and a glycol/water, gas heat exchanger.

The method will now be described with reference to FIG. 1 through 3.

In the presently described method, the refrigeration energy is provided by the recovery of pressure energy currently wasted at pressure reduction stations. The recovered energy also allows methanol to be refrigerated at much colder temperatures and hence at higher efficiencies. For example, in the presently described method, the average refrigerated methanol temperature is −80° C.

The present method was developed with a view to prepare a natural gas stream to produce LNG at gas pressure reduction stations. The method uses the methane expansion cycle in a different manner, which to date is used in commercial applications known as pressure reduction stations. The system here described takes advantage of the gas streams delivered to regional distribution pipelines at pressure reduction stations to provide an improved method of producing LNG at gas pressure reduction stations. In one example, this method pre-treats and removes water and carbon dioxide and uses methanol that is refrigerated by energy recovered from transmission pipeline pressure available at the pressure reduction station inlet. The method produces and recovers transmission pipeline pressure energy at gas pressure reduction stations to refrigerate a methanol stream and use it as a carbon dioxide stripping agent in a stripping column. In the description that follows, Referring to FIG. 1, a typical gas pressure reduction station of a natural gas main transmission pipeline. Once the principles of operation are understood, it will be understood by those skilled in the art that variations are possible using known pressure and temperature equipment. Natural gas is delivered from a high pressure main transmission pipeline, natural gas stream 1 enters pressure the pressure reduction station through block valve 2 and is pre-heated in heat exchanger 3. The pre-heated gas stream 4 pressure, is reduced through a JT valve 5 to regional distribution pipeline 6 pressure. The regional distribution pipeline 6 pressure is maintained by pressure transmitter 7 which controls JT valve 5 natural gas flow. A closed recycling loop glycol/water 11 transfers the heat from heater 10 to gas heat exchanger 3 to pre-heat the gas. A temperature transmitter 8 monitors and controls the regional gas distribution pipeline temperature by controlling the gas flow stream 9 to a glycol/water heater 10. A closed loop recycling glycol/water 11 transfers the heat from heater 10 to gas heat exchanger 3 to pre-heat the inlet gas stream to the pressure reduction station. This simplified process arrangement as shown in FIG. 1 constitutes a standard operation at gas pressure reduction stations. The purpose of pre-heating the gas before decreasing the pressure at the pressure reduction station is to prevent the formation of hydrates due to the presence of water in the gas composition.

Figure 2:
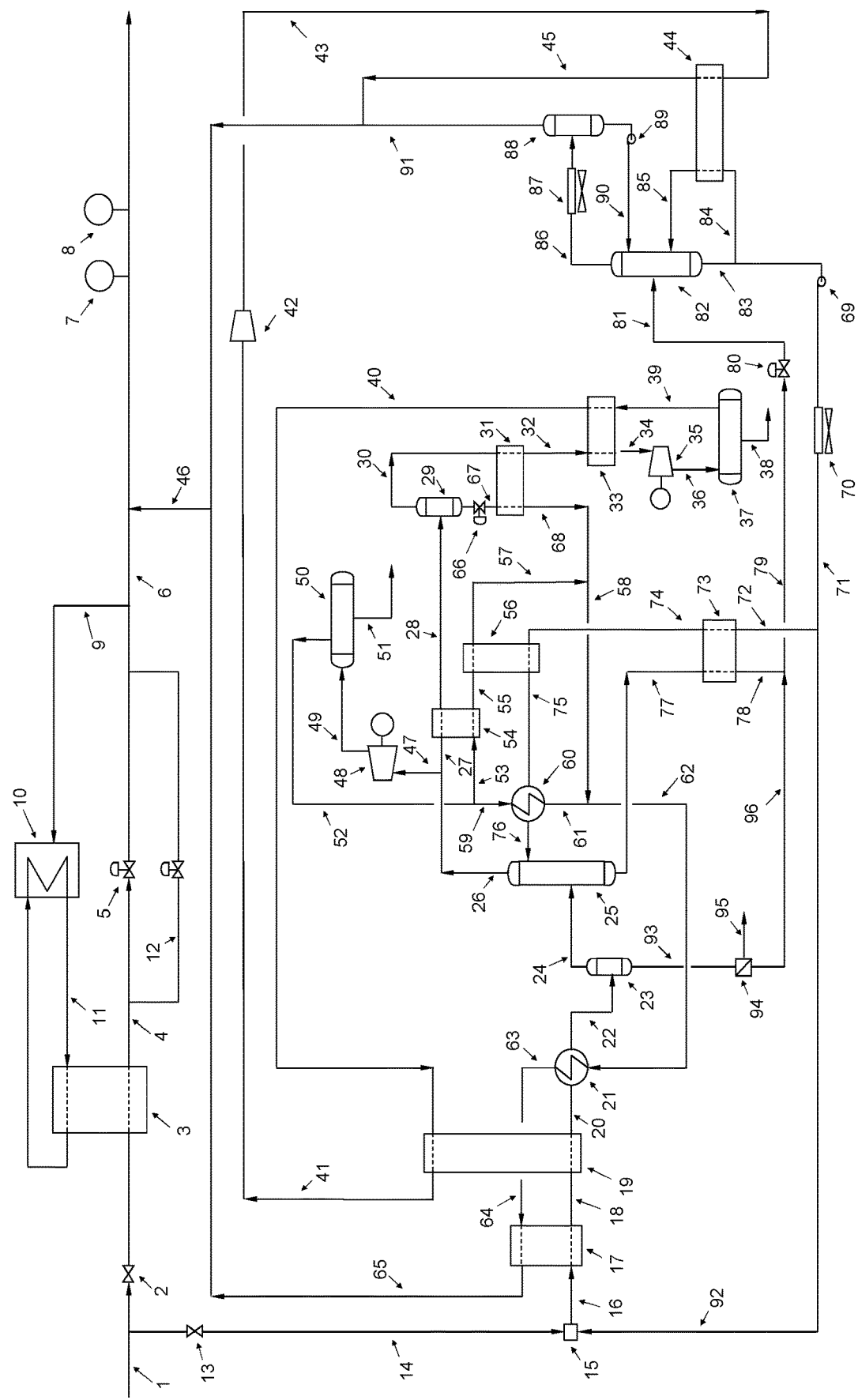
FIG. 2 is a schematic diagram of a LNG production process added to an existing gas pressure letdown station and equipped with; gas pre-treatment units, heat exchangers, a stripping column, gas expanders, KO drums, pumps and LNG storage. The process natural gas stream is supplied from high pressure natural gas transmission pipeline.
Figure 3:
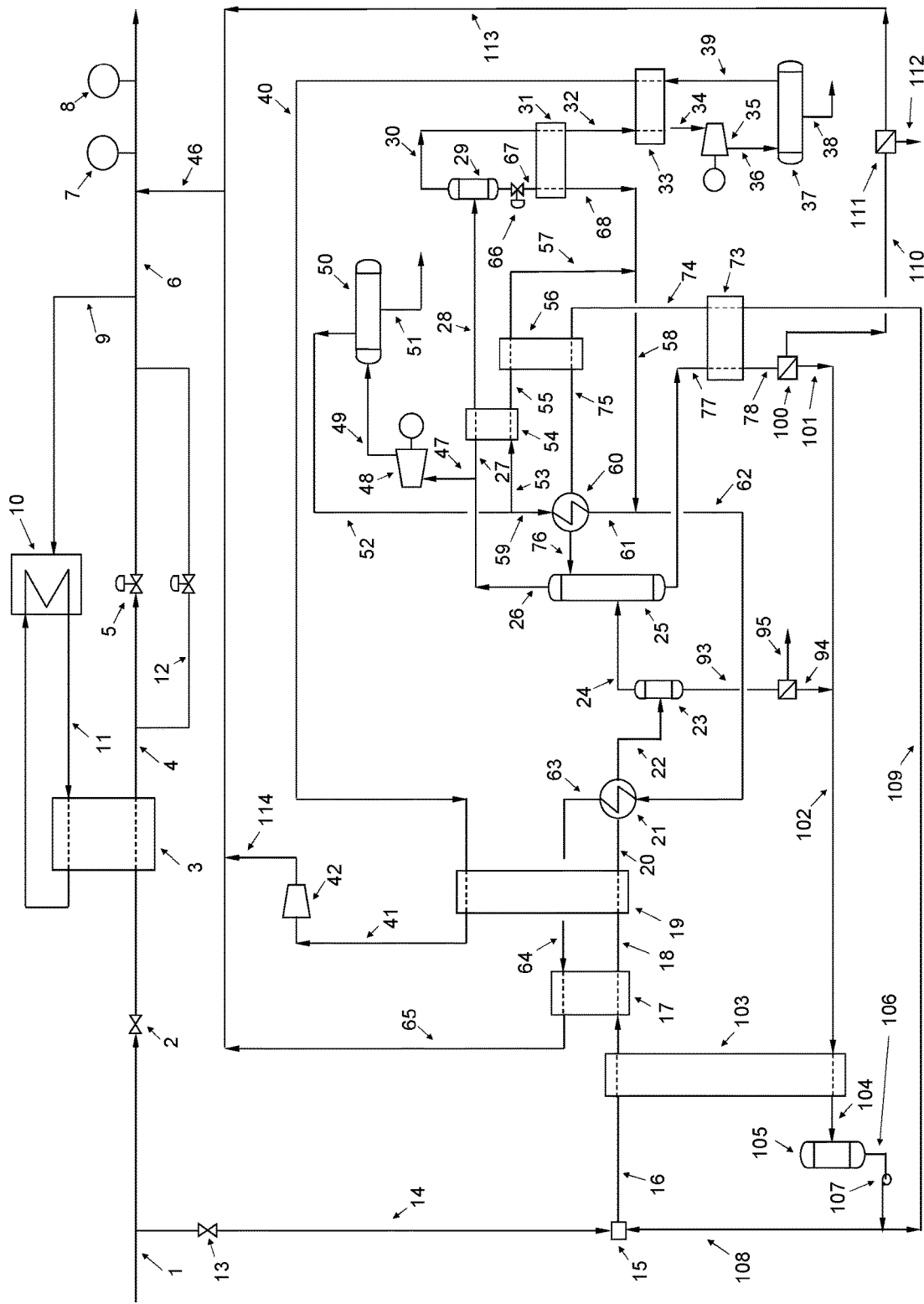
FIG. 3 is a schematic diagram of an alternate LNG production process.

Referring to FIG. 2, the process is shown as being operated in parallel at an existing pressure reduction station. As depicted, stream 1 is routed to the LNG production plant by closing pressure reduction block valve 2 and opening valve 13. The natural gas stream 14 passes through in-line mixer 15 where a methanol stream 92 is added as a hydrate inhibitor to keep the water content of the gas in a liquid solution. The hydrate inhibited stream 16 is first pre-cooled in heat exchanger 17, and further cooled in heat exchangers 19 and 21, the colder gas stream 22 enters gas/liquid separator 23 where the water and methanol is removed through stream 93. The vapour fraction 24 is routed to carbon dioxide stripping column 25 and flows upward in direct contact and in a counter current flow with refrigerated methanol from stream 76. The carbon dioxide stripping column internals can be bubble tray or packing bed contact tower. The refrigerated methanol strips the carbon dioxide fraction from the gas and carries it to the bottom of the column and exits through stream 77 for regeneration. The natural gas now stripped of carbon dioxide exits column 25 through overhead stream 26.

A large portion of pre-treated gas stream 26 is routed through stream 47 to a pressure reducing gas expander/generator 48, where the discharged pressure is controlled by regional gas distribution pipeline pressure, connector gas stream 46. The pressure reduction across gas expander/generator 48 produces electrical energy and reduces stream 49 temperature due to the Joules Thompson effect. The colder gas stream 49 enters separator 50 where the condensate fraction 51 is removed as natural gas liquids. The gaseous stream 52 is the main refrigeration stream for the process.

The pre-treated gaseous stream 27 is further cooled in heat exchanger 54, and the resultant cooler gas stream 28 enters separator 29 for condensate removal. The objective of heat exchanger 54 followed by separator 29 is to control the composition of natural gas stream 30 to meet LNG product specifications. The leaner gas stream 30 is further cooled in heat exchangers 31 and 33 before reducing its pressure through a second gas expander/generator 35, producing more electrical energy. The pressure reduced stream 36 enters separator 37 where liquid natural gas is separated and routed through stream 38 to storage. The cryogenic gaseous stream 39 is routed through lines 39 and 40 to heat exchangers 33 and 19 to recover its cryogenic energy, and routed to compressor 42 through gas stream 41. The compressed and heated gas stream 43 is routed through heat exchanger 44, where it gives up its compression heat and routed through stream 45 to regional distribution gas pipeline connector stream 46.

The natural gas refrigeration stream 53 is flow controlled through heat exchanger 54 to provide cooling requirements for condensation of heavier fractions in stream 28, thus controlling gas stream composition of stream 30. The natural gas refrigeration stream 55 exits heat exchanger 54 and provides further refrigeration at heat exchanger 56, exiting as stream 57 and, for further refrigeration, mixing with stream 68 into stream 58, and further mixing with stream 61 into stream 62.

The natural gas refrigeration stream 59 is routed through heat exchanger 60 to control the temperature of refrigerated methanol stream 76 entering carbon dioxide stripping column 25. The refrigerated stream 61 exits heat exchanger 60 and mixes with natural gas refrigeration streams 57 and 68, via stream 58, forming natural gas refrigeration stream 62. The natural gas refrigeration stream 62 enters heat exchanger 21, followed by heat exchanger 17 via lines 63 and 64 giving up its remaining refrigeration energy to natural gas stream 14 entering the pressure reduction station. The heat recovery gas stream 65 is routed to the regional gas distribution pipeline 6, through connector stream 46. This heat exchange arrangement eliminates the present practice of pre-heating natural gas at pressure reduction stations by gas combustion.

The regenerated methanol stream 83 is routed to pump 69 and pre-cooled by an ambient air fin fan heat exchanger 70. The regenerated pre-cooled methanol stream 71 is split into streams 72 and 92. The regenerated methanol stream 72 is further cooled in heat exchangers 73, 56 and 60, via streams 72, 74 and 75, before entering the top tray of carbon dioxide stripping column 25 via stream 76. The refrigerated methanol flows downward the column in a counter-current flow with natural gas, stripping the carbon dioxide fraction from the natural gas stream and exiting at the bottom of the column as a rich methanol stream 77, through heat exchanger 73 to pre-cool the regenerated methanol. The preheated rich methanol stream 78 mixes with rich methanol stream 96 into methanol rich stream 79, through pressure reduction valve 80 and through stream 81 into methanol regeneration column 82. A reboiler stream 84 is heated by heat exchanger 44 to vaporize the carbon dioxide from the methanol into stream 85. The methanol regeneration column overhead stream 86 from column 82 is pre-cooled by an ambient air fin fan heat exchanger 87 before entering separator 88. A reflux stream 90 is routed through pump 89 to control the overhead temperature of column 82. The vapour stream 91 exits methanol regeneration column 88 and is routed to the regional gas distribution pipeline 6 through connector stream 46. A regenerated methanol stream 92 is routed to gas mixer 15 at a controlled dosage as a hydrate inhibitor. The hydrate inhibitor methanol stream fraction of stream 22 along with the water in the natural gas stream is condensed and recovered at separator 23. The condensed mixture leaves separator 23 through stream 93 into a solvent membrane 94 where water stream is removed through stream 95, the recovered methanol is routed through line 96 into methanol regeneration column 82.

In the depicted example, the process uses the pressure energy in the pressure reduction gas inlet stream to generate a refrigeration stream that is used to refrigerate a methanol stream to absorb and remove carbon dioxide in a $CO_2$ stripping column at gas pressure reduction stations. The use of expanders/generators in pressure reduction processes to generate the Joule Thompson effect is well understood and in practice in the gas industry in various forms. An advantage of the proposed process is the configuration that the recovery of pressure energy in the inlet gas stream to generate a refrigeration gas stream to refrigerate a methanol to strip carbon dioxide in a stripping column at pressure reduction stations.

As will be understood, the embodiment in FIG. 2 is an example, and there are alternative designs that may be used to accomplish similar results. For example, FIG. 3 uses membrane separators 100 and 111 instead of expansion valve 80, separation tanks 82 and 88, and other equipment as described above with respect to FIG. 2 to separate methanol into streams 101 and 112, and carbon dioxide into streams 110 and 113. Those skilled in the art will understand that other equipment may be used to accomplish similar results to those described herein.

Typically pressure reduction stations operate as shown in FIG. 1, requiring the use of a portion of the gas flow (generally about 1% of the total inlet gas flow to the pressure reduction station) to pre-heat the gas and prevent the formation of hydrates. When using the process, the need for combusting gas for gas pre-heating and the need to use the industry standard mol sieve technology at a pressure reductions station for the removal of $CO_2$ from a natural gas stream to produce LNG may be reduced or eliminated.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the preferred embodiments set forth in the examples, but should be given a broad purposive interpretation consistent with the description as a whole.

What is claimed is:

1. A method to pre-treat and produce LNG at a gas pressure reduction station, comprising:
    providing a high pressure natural gas stream;
    pre-cooling the high pressure natural gas stream in a heat exchanger;
    injecting methanol into the high pressure natural gas stream and separating condensates from the high pressure natural gas stream to produce a dewatered natural gas stream in a phase separator;
    recovering methanol from the condensates using a solvent membrane;
    passing the dewatered natural gas stream through a carbon dioxide stripping column to remove carbon dioxide from the dewatered natural gas stream to produce a treated natural gas stream;
    splitting the treated natural gas stream into a LNG production stream and a distribution stream;
    reducing a gas pressure of the distribution stream and recovering condensed hydrocarbon fractions from the distribution stream;
    injecting a pre-cooled methanol stream through the carbon dioxide stripping column and removing a rich methanol stream from the carbon dioxide stripping column, the rich methanol stream comprising the pre-cooled methanol stream and carbon dioxide;
    reducing a temperature and a pressure of the LNG production stream and recovering a liquid hydrocarbon fraction and a gaseous fraction from the LNG production stream;
    compressing and outputting the gaseous fraction of the LNG production stream as an output of the gas pressure reduction station;
    recovering methanol from the rich methanol stream by removing the carbon dioxide from the rich methanol stream; and
    obtaining a cooled recovered methanol stream by cooling the recovered methanol and splitting the cooled recovered methanol stream into a first methanol stream to be injected into the high pressure natural gas stream and a second methanol stream to be injected into the carbon dioxide stripping column.

2. The method of claim 1, wherein the high pressure natural gas stream is pre-cooled by low temperatures produced downstream of the phase separator.

3. The method of claim 1, wherein heat exchangers are employed to pre-heat the gaseous fraction of the LNG production stream prior to being output as the output of the gas pressure reduction station.

4. The method of claim 1, wherein the condensates from the high pressure natural gas stream comprise water.

5. The method of claim 1, wherein the carbon dioxide stripping column removes carbon dioxide in a counter-current flow with a refrigerated methanol stream.

6. The method of claim 1, where the LNG production stream is cooled to condense heavier hydrocarbon fractions prior to being condensed as LNG.

7. The method in claim 1, where the recovered methanol is cooled using recovered pressure energy at the gas pressure reduction station.

* * * * *